United States Patent
Chen (10) Patent No.: US 12,407,935 B1
(45) Date of Patent: Sep. 2, 2025

(54) PANORAMIC IMAGE APPARATUS, METHOD FOR CALIBRATING PANORAMIC IMAGE AND COMPUTER-READABLE MEDIUM

(71) Applicant: AmTRAN TECHNOLOGY Co., Ltd., New Taipei (TW)

(72) Inventor: Che-Hui Chen, New Taipei (TW)

(73) Assignee: AmTRAN TECHNOLOGY Co., Ltd., New Taipei (TW)

( * ) Notice: Subject to any disclaimer, the term of this patent is extended or adjusted under 35 U.S.C. 154(b) by 0 days.

(21) Appl. No.: 18/922,221

(22) Filed: Oct. 21, 2024

(30) Foreign Application Priority Data

May 21, 2024 (TW) .................................. 113118717

(51) Int. Cl.
  *H04N 23/698* (2023.01)
  *G06T 7/80* (2017.01)
(52) U.S. Cl.
  CPC ............. *H04N 23/698* (2023.01); *G06T 7/80* (2017.01)
(58) Field of Classification Search
  CPC ................................ H04N 23/698; G06T 7/80
  USPC .......................................................... 348/36
  See application file for complete search history.

(56) References Cited

U.S. PATENT DOCUMENTS

| | | | |
|---|---|---|---|
| 2008/0012850 A1* | 1/2008 | Keating Iii | .......... H04N 13/254 348/E13.016 |
| 2020/0226789 A1* | 7/2020 | Ma | ............................ G06T 7/70 |
| 2021/0199479 A1* | 7/2021 | Lau | ........................ G01S 13/931 |

FOREIGN PATENT DOCUMENTS

TW 200841702 10/2008

OTHER PUBLICATIONS

"Office Action of Taiwan Counterpart Application", issued on Mar. 10, 2025, p. 1-p. 13.

* cited by examiner

*Primary Examiner* — Dave Czekaj
(74) *Attorney, Agent, or Firm* — JCIPRNET (57) ABSTRACT

Disclosed is a panoramic image apparatus including a calibration plate, a panoramic camera and a controller. The calibration plate has a calibration pattern and is configured to be placed in a vertical direction. The panoramic camera is adapted to capture toward a space including the calibration plate, and is configured to capture in the vertical direction to capture a panoramic image including the calibration pattern image corresponding to the calibration pattern. The controller is electrically connected to the panoramic camera. The controller is configured to calibrate the panoramic image according to the calibration pattern and a variation of the calibration pattern image in the vertical direction at an edge of an image to provide a calibrated panoramic image. A method for calibrating a panoramic image and a computer-readable medium are also disclosed.

11 Claims, 8 Drawing Sheets

The center of the panoramic image is unfolded by the controller to capture the unfolded panoramic image, and then the calibrated panoramic image is captured according to the unfolded panoramic image and the trend line ~S220

FIG. 14

An inverse function operation is performed on the unfolded panoramic image within the range covered by the trend line by the controller using the trend line, so as to capture the calibrated panoramic image ~S222

FIG. 15

The partial image of the unfolded panoramic image is extracted by the controller, and an inverse function operation is performed on the partial image within the range of the trend line corresponding to the partial image by the controller using the trend line TL to capture the calibrated panoramic image ~S222'

PANORAMIC IMAGE APPARATUS, METHOD FOR CALIBRATING PANORAMIC IMAGE AND COMPUTER-READABLE MEDIUM

CROSS-REFERENCE TO RELATED APPLICATION

This application claims the priority benefit of Taiwan application no. 113118717, filed on May 21, 2024. The entirety of the above-mentioned patent application is hereby incorporated by reference herein and made a part of this specification.

BACKGROUND

Technical Field

The present disclosure relates to a panoramic image apparatus, a method for calibrating a panoramic image and a computer-readable medium.

Description of Related Art

When it is desired to create panoramic images, fisheye cameras serve as a very good choice. In application of a fisheye camera, the fisheye camera is normally placed in the manner of facing upward, so that it is possible to take advantage of the inherent characteristic of the fisheye camera to get a 360 degree view of a place. However, due to the limitations of the optical mechanism of the fisheye camera, the portion at the edge of the captured image will be compressed, and therefore, there is an imbalance in the proportion of objects in the center and edge of the picture.

SUMMARY

The present disclosure provides a panoramic image apparatus, a method for calibrating panoramic image and a computer-readable medium, which may easily calibrate the imbalance of proportion between the center and the edge of a panoramic image.

An embodiment of the disclosure provides a panoramic image apparatus including a calibration plate, a panoramic camera and a controller. The calibration plate has a calibration pattern and is configured to be placed in a vertical direction. The panoramic camera is adapted to capture images of a space including the calibration plate, and is configured to capture images in the vertical direction to capture a panoramic image that includes a calibration pattern image corresponding to the calibration pattern. The controller is electrically connected to the panoramic camera. The controller is configured to calibrate the panoramic image according to the calibration pattern and a variation of the calibration pattern image in the vertical direction at an edge of an image to provide a calibrated panoramic image.

An embodiment of the disclosure provides a method for calibrating a panoramic image, and the method includes the following steps: placing a calibration plate in a vertical direction, wherein the calibration plate has a calibration pattern; capturing toward a space including the calibration plate by using the panoramic camera, and capturing in the vertical direction to capture a panoramic image including the calibration pattern image corresponding to the calibration pattern; calibrating the panoramic image by using a controller according to the calibration pattern and a variation of the calibration pattern image in the vertical direction at an edge of an image to provide a calibrated panoramic image.

An embodiment of the present disclosure provides a computer-readable medium storing program code. The program code is configured to perform the above-mentioned method for calibrating the panoramic image.

In summary, according to an embodiment of the disclosure, in the panoramic image apparatus, the method for calibrating a panoramic image or the computer-readable medium, the panoramic image camera is utilized to capture toward the space including the calibration plate, and the controller is utilized to calibrate the panoramic image according to the calibration pattern and the variation of the calibration pattern image in the vertical direction at the edge of the image to provide the calibrated panoramic image. In this way, the imbalance of proportion between the center and the edge of the panoramic image may be easily calibrated.

DESCRIPTION OF THE EMBODIMENTS

Figure 1:
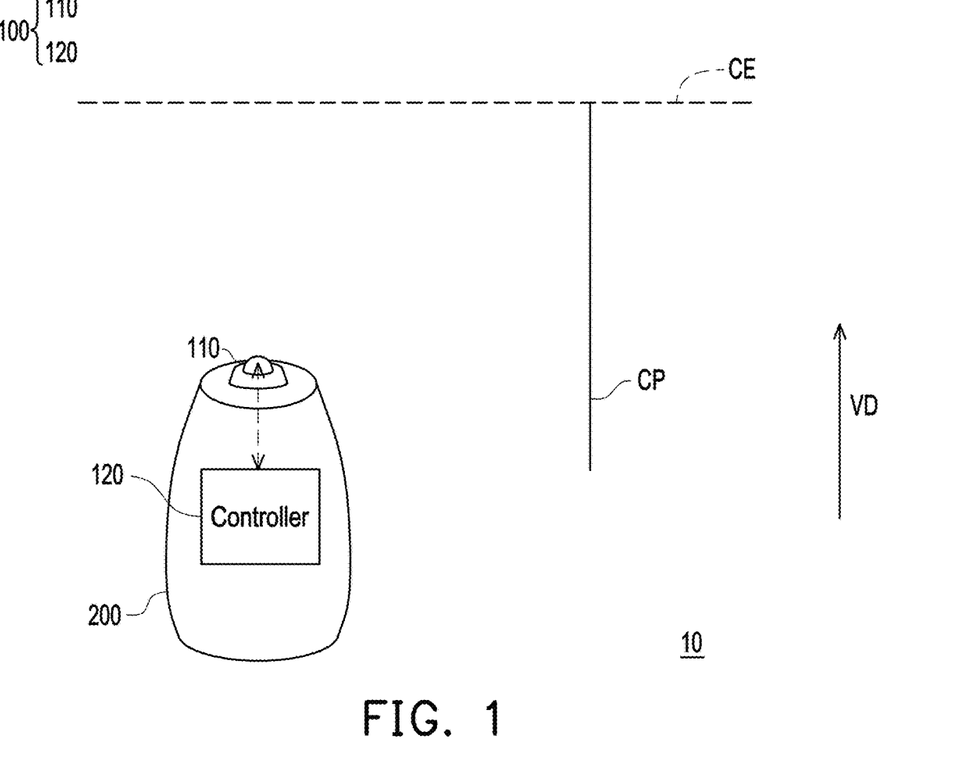
FIG. 1 is a schematic view of a panoramic image system according to an embodiment of the present disclosure.

FIG. 1 is a schematic view of a panoramic image system according to an embodiment of the present disclosure. Referring to FIG. 1, an embodiment of the present disclosure provides a panoramic image system 10, which includes a panoramic image apparatus 100 and a housing 200. The panoramic image apparatus 100 is disposed in the housing 200. The panoramic image apparatus 100 includes a calibration plate CP, a panoramic camera 110 and a controller 120.

In this embodiment, the panoramic camera 110 is, for example, a fisheye camera or a wide-angle camera, but the disclosure is not limited thereto.

Figure 2:
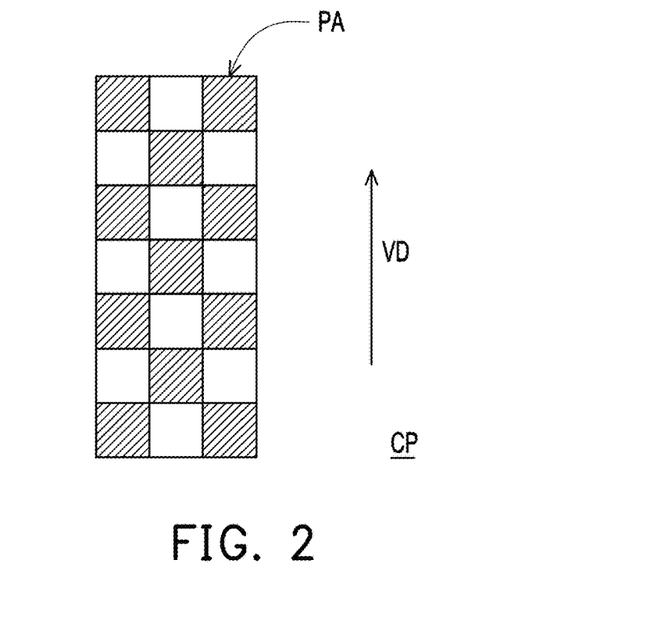
FIG. 2 is an example of the calibration plate in FIG. 1.

FIG. 2 is an example of the calibration plate in FIG. 1. Please refer to FIG. 2. In this embodiment, the calibration plate CP has a calibration pattern PA and is placed along the vertical direction VD. For example, in FIG. 2, the calibration pattern PA may be a checkerboard pattern staggered with different gray levels (for example, staggered black and white pattern), but the present disclosure is not limited thereto. In another embodiment, the calibration pattern PA may be provided only at the edge of the calibration plate CP.

Figure 3:
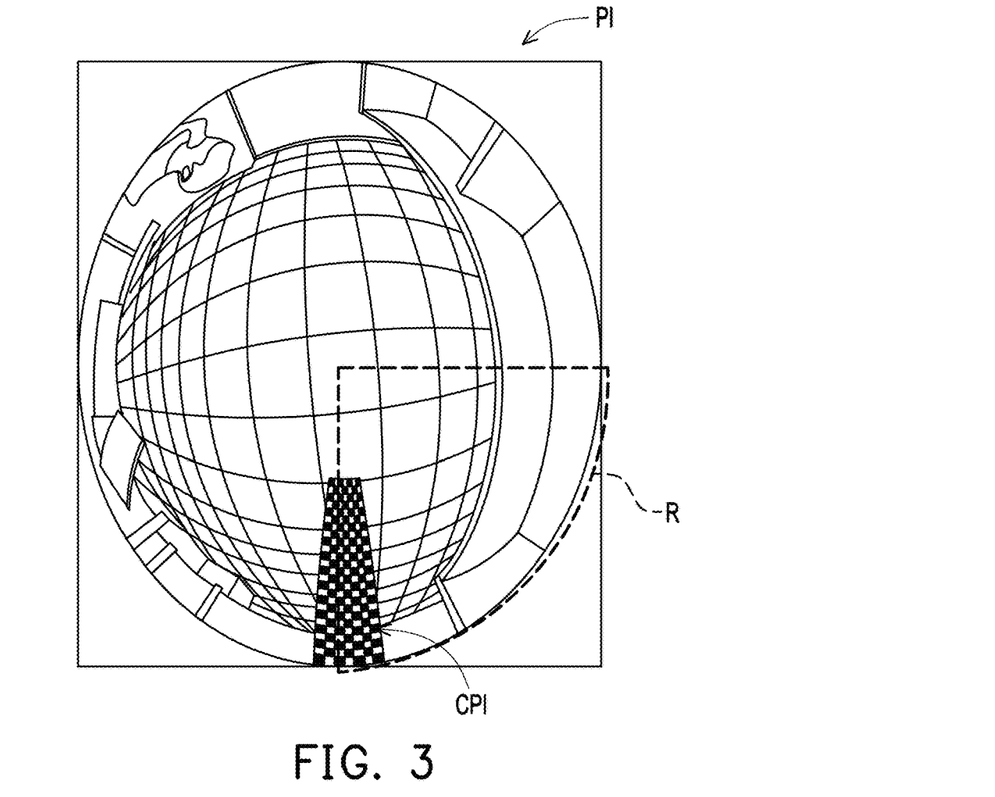
FIG. 3 is an example of a panoramic image captured by a panoramic image apparatus according to an embodiment of the present disclosure.

FIG. 3 is an example of a panoramic image captured by a panoramic image apparatus according to an embodiment of the present disclosure. Please refer to FIG. 1 to FIG. 3. In this embodiment, the panoramic camera 110 is adapted to capture toward the space including the calibration plate CP, and is configured to capture in the vertical direction VD to capture a panoramic image PI including the calibration pattern image CPI corresponding to the calibration pattern PA. The vertical direction VD is, for example, the direction of gravity, or the direction toward the ceiling CE as shown in FIG. 1, but the present disclosure is not limited thereto. That is, the vertical direction VD may be defined as a direction in which the capturing direction of the panoramic camera 110 and the configuration direction of the calibration plate CP are parallel to each other. In addition, when the panoramic camera 110 captures in the vertical direction VD, it may also be defined as the optical axis of the panoramic camera 110 being parallel to the vertical direction VD.

In this embodiment, the controller 120 includes, for example, a central processing unit (CPU), a microprocessor, a digital signal processor (DSP), a programmable controller, a programmable logic device (PLD), a graphic processing unit (GPU) or other similar devices or combinations of these devices, the present disclosure is not limited thereto. Furthermore, in an embodiment, various functions of the controller 120 may be implemented in multiple program codes. These program codes will be stored in a memory unit, and the controller 120 will execute these program codes. Alternatively, in an embodiment, various functions of the controller 120 may be implemented as one or more circuits. The present disclosure provides no limitation to implementing each function of the controller 120 with software or hardware.

In this embodiment, the controller 120 is electrically connected to the panoramic camera 110. The controller 120 is configured to calibrate the panoramic image PI according to the calibration pattern PA and the variation of the calibration pattern image CPI along the vertical direction VD at the edge of the image to provide a calibrated panoramic image (for example, the calibrated panoramic image CI" shown in FIG. 7).

Figure 7:
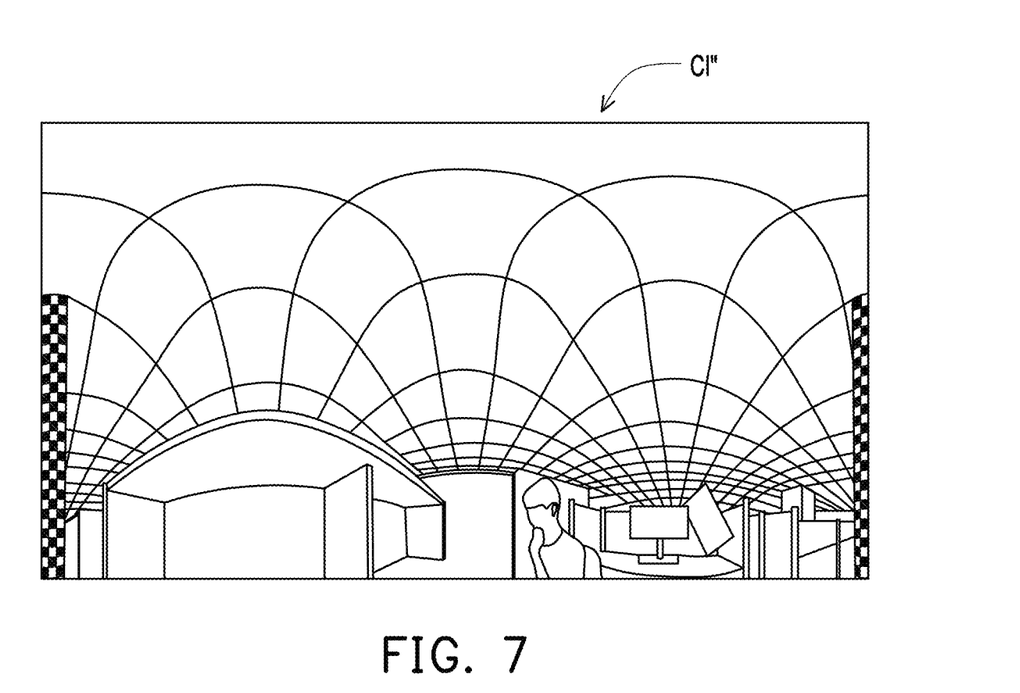
FIG. 7 is a schematic view of the calibrated panoramic image captured according to FIG. 3.

The process of the controller 120 capturing the calibrated panoramic image CI" will be described in detail below.

Figure 4:
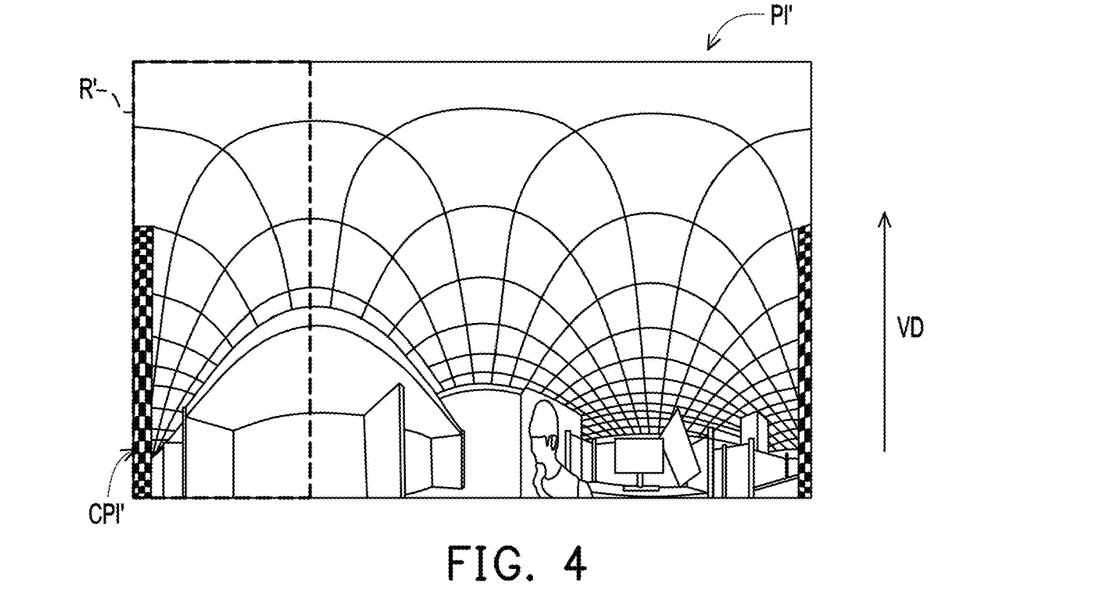
FIG. 4 is a schematic view of capturing the unfolded panoramic image after unfolding the center of the circle in FIG. 3.
Figure 5:
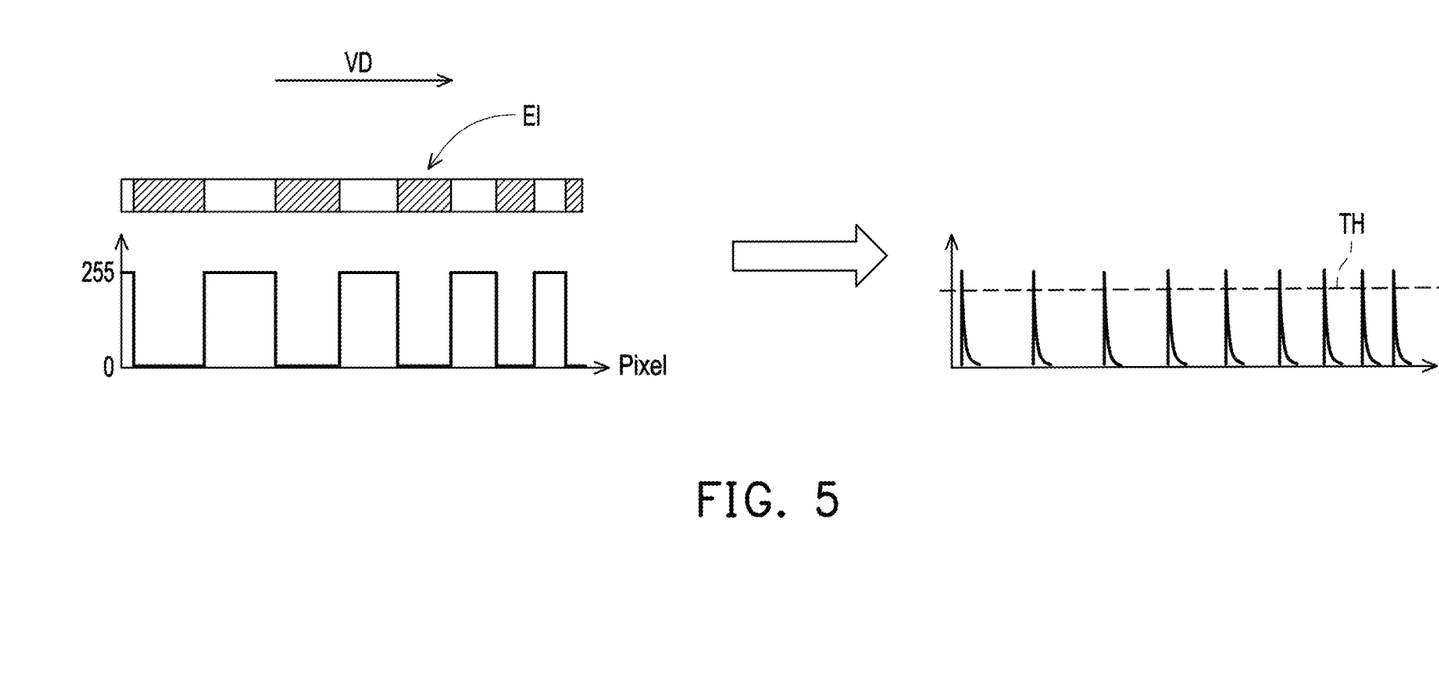
FIG. 5 is a schematic view showing the image in FIG. 4 after being grayscaled along the vertical direction at the edge of the image, with a first-order differential and an absolute value thereof being taken.
Figure 6:
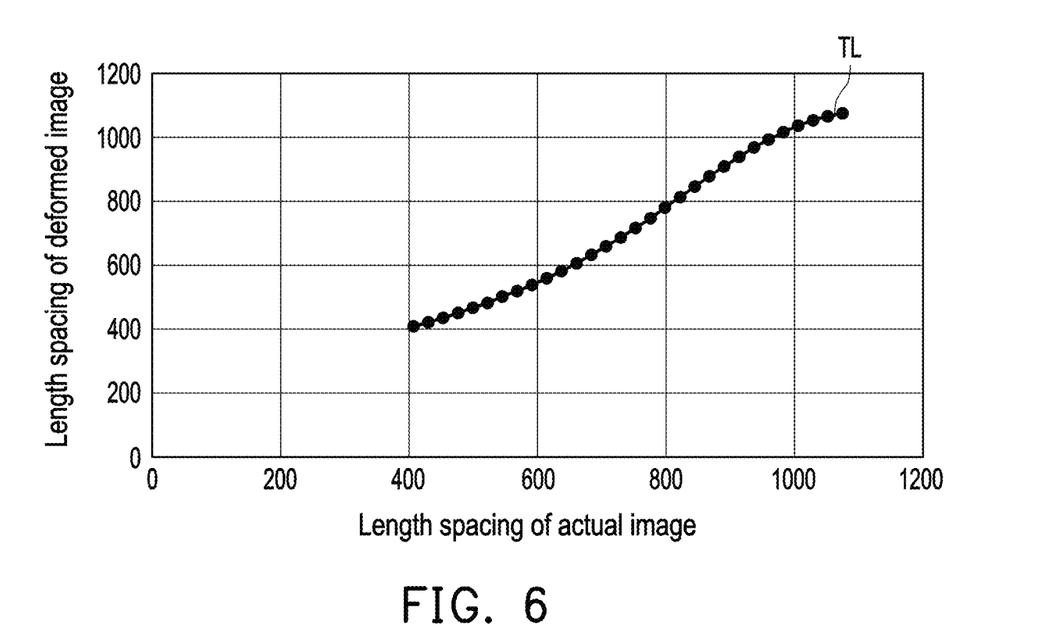
FIG. 6 is a schematic view of a trend line obtained according to FIG. 5.

FIG. 4 is a schematic view of the unfolded panoramic image captured by unfolding the center of the circle from FIG. 3. FIG. 5 is a schematic view showing the image in FIG. 4 after being grayscaled along the vertical direction at the edge of the image, with a first-order differential and an absolute value thereof being taken. FIG. 6 is a schematic view of a trend line obtained according to FIG. 5. FIG. 7 is a schematic view of the calibrated panoramic image captured according to FIG. 3.

Please refer to FIG. 3 to FIG. 7. In this embodiment, the controller 120 is configured to unfold the center of the panoramic image PI to capture an unfolded panoramic image PI' (as shown in FIG. 3 to FIG. 4). Unfolding the center is, for example, an unfolding method taking the center of the panoramic image PI as the center and taking the radius from the center as the height. For example, the center of the region R in FIG. 3 is unfolded to form the region R' in FIG. 4, the center of the calibration pattern image CPI in FIG. 3 is unfolded to form the calibration pattern image CPI' in FIG. 4. Then, the controller 120 captures the calibrated panoramic image CI" based on the unfolded panoramic image PI' and the trend line TL (as shown in FIG. 4 to FIG. 7).

In this embodiment, as shown in FIG. 6, the trend line TL is a trend curve formed according to a length spacing of a deformed image relative to a length spacing of an actual image. The length spacing of the deformed image is a spacing between multiple positions with a value higher than a threshold TH after grayscaling the image (that is, the calibration pattern image CPI' in FIG. 4) in the unfolded panoramic image PI' corresponding to the calibration pattern image CPI (in FIG. 3) along the vertical direction VD at the edge of the image (for example, the image EI at the edge of FIG. 5), as shown on the left side of FIG. 5. Afterward, a first-order differential and an absolute value thereof being taken (as shown on the right side of FIG. 5). Similar to the length spacing of the deformed image, the length spacing of the actual image is a spacing between multiple positions with a value higher than the threshold TH after grayscaling the image of the calibration pattern PA along the vertical direction VD at the edge of the image, with a first-order differential and an absolute value thereof being taken. Grayscaling is performed by, for example, setting the pixel with the greatest brightness in the image to 255, and setting the pixel with the least brightness in the image to 0, as shown in FIG. 5. In an embodiment, the image of the calibration pattern PA may be stored in the memory unit in advance. Thereafter, in this embodiment, the controller 120 adjusts the trend line TL within the preset range (i.e., the range covered by the trend line TL) to be linear (when the calibration pattern PA changes linearly) to calibrate the panoramic image PI. The method for calibration will be described in detail below.

In this embodiment, the controller 120 is configured to utilize the trend line TL to perform an inverse function operation on the unfolded panoramic image PI' within the range covered by the trend line TL, so as to capture the calibrated panoramic image CI'. In other words, only the range covered by the trend line TL (that is, the range where the projection perpendicular to the vertical direction VD in FIG. 4 falls within the calibration pattern image CPI') may be calibrated by the calibration plate CP.

Figure 8:
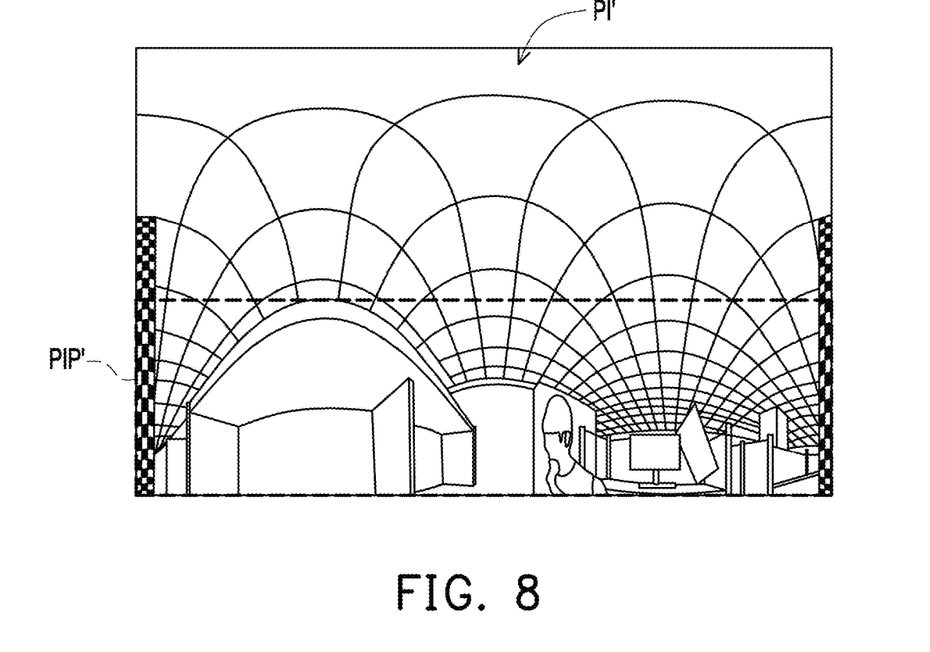
FIG. 8 is a schematic view of a partial image in FIG. 3.
Figure 9:
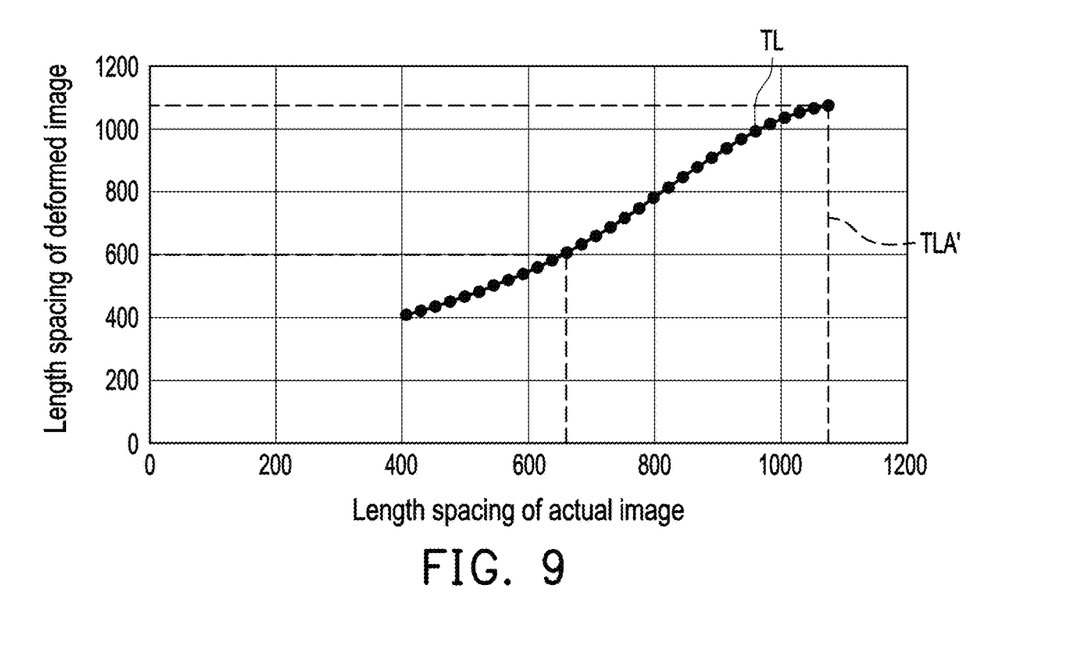
FIG. 9 is a schematic view corresponding to the partial image in FIG. 3 in a range of the trend line in FIG. 6.
Figure 10:
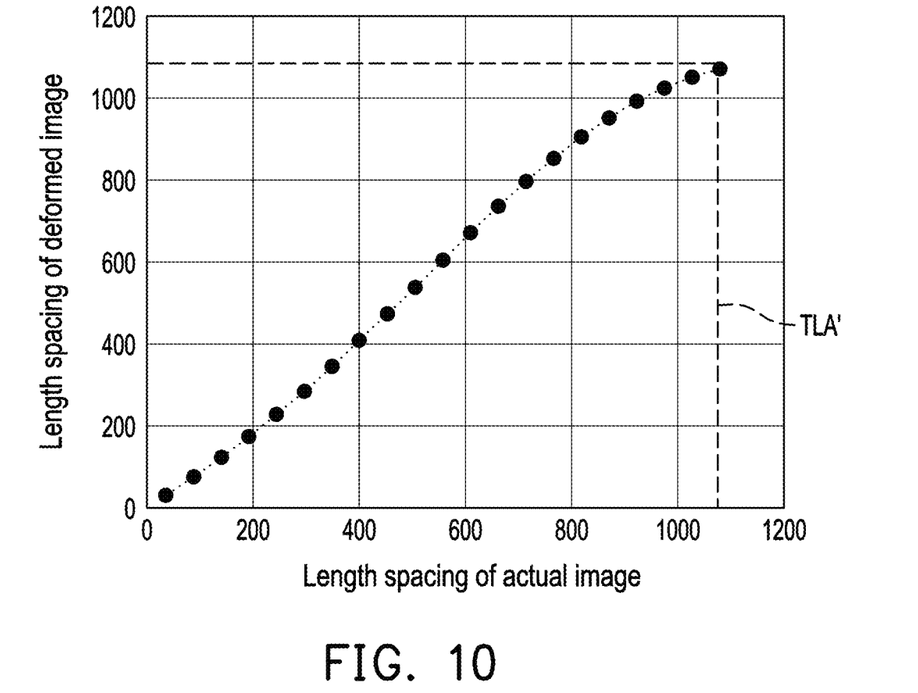
FIG. 10 is a schematic view capturing the range TLA' of the trend line in FIG. 9.
Figure 11:
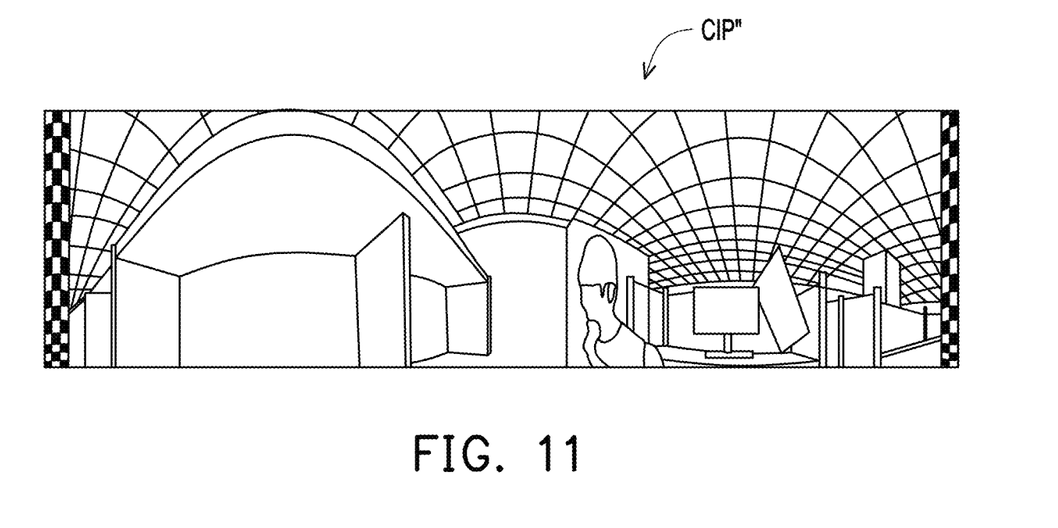
FIG. 11 is a schematic view of the calibrated panoramic image captured according to FIG. 8.

FIG. 8 is a schematic view of a partial image in FIG. 3. FIG. 9 is a schematic view corresponding to the partial image in FIG. 3 in a range of the trend line in FIG. 6. FIG. 10 is a schematic view capturing the range TLA' of the trend line in FIG. 9. FIG. 11 is a schematic view of the calibrated panoramic image captured according to FIG. 8. Please refer to FIG. 3 and FIG. 8 to FIG. 11. In another embodiment, the controller 120 is configured to extract the partial image PIP' of the unfolded panoramic image PI and use the trend line TL to perform an inverse function operation on the partial image PIP' within the corresponding range TLA' of the trend line TL to capture the calibrated panoramic image CIP'". The range TLA' of the trend line TL corresponding to the partial image PIP' is, for example, the range of the trend line TL in FIG. 9 associated with the length spacing of the deformed image is consistent with the range of the partial image PIP' in the vertical direction VD, then the vertical range in the range TLA' is enlarged so as to be consistent with the range (i.e., 0 to 1080) of the original output height. Then, the range TLA' in the trend line TL is moved laterally to the position of the origin 0, then the horizontal range in the range TLA' is enlarged so as to be consistent with the range (i.e., 0 to 1080) of the original output width, as shown in FIG. 10.

That is to say, when it is only required to output/capture the range of the partial image PIP', the obtained trend line TL may be utilized to directly calibrate the partial image PIP' to capture the calibrated panoramic image CIP'''. Therefore, compared with the existing method through which a complete and unfolded panoramic image PI' is calibrated first, followed by extracting the partial image therein and enlarging the image afterwards, in the embodiment of the disclosure, the partial image PIP' is extracted first followed by calibration, and then the image is enlarged. In this way, it is possible to enlarge the image while maintaining the accuracy of pixels as much as possible. Therefore, the calibrated panoramic image CIP''' with better image quality may be captured.

Figure 12:
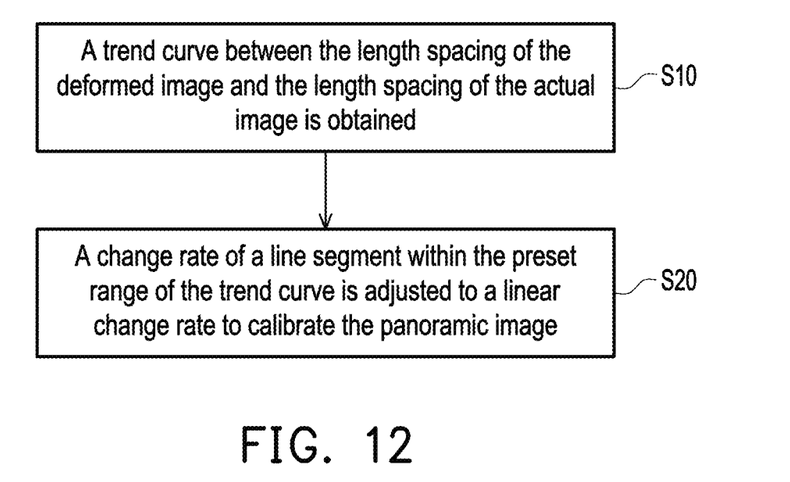
FIG. 12 is a flow chart of a method for calibrating a panoramic image according to an embodiment of the present disclosure.

FIG. 12 is a flow chart of a method for calibrating a panoramic image according to an embodiment of the present disclosure. Please refer to FIG. 12. An embodiment of the present disclosure provides a method for calibrating a panoramic image PI, which includes the following steps. In Step S10, a trend curve between the length spacing of the deformed image and the length spacing of the actual image is captured. In Step S20, a change rate of a line segment within the preset range of the trend curve is adjusted to a linear change rate to calibrate the panoramic image PI.

Figure 13:
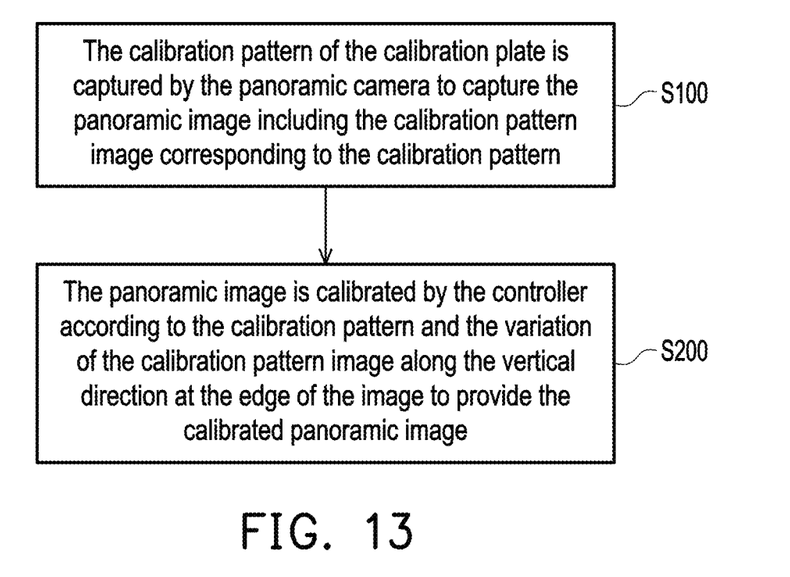
FIG. 13 is a flow chart of providing a calibrated panoramic image in a method for calibrating a panoramic image according to an embodiment of the present disclosure.

FIG. 13 is a flow chart of providing a calibrated panoramic image in a method for calibrating a panoramic image according to an embodiment of the present disclosure. Please refer to FIG. 13. The method for calibrating a panoramic image PI further includes the following steps. In Step S100, the calibration pattern PA of the calibration plate CP is captured by the panoramic camera 110 to capture the panoramic image PI including the calibration pattern image CPI corresponding to the calibration pattern PA, wherein the calibration pattern PA extends along the vertical direction VD. In Step S200, the panoramic image PI is calibrated by the controller 120 according to the calibration pattern PA and the variation of the calibration pattern image CPI along the vertical direction VD at the edge of the image to provide the calibrated panoramic image CI''.

Figure 14:
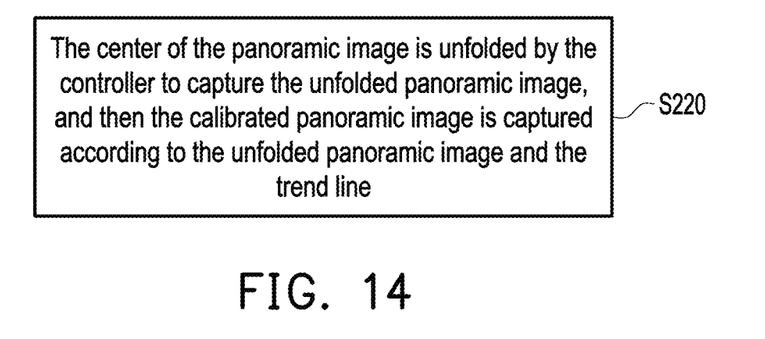
FIG. 14 is a flow chart of Step S200 in FIG. 13.

FIG. 14 is a flow chart of Step S200 in FIG. 13. Please refer to FIG. 14. In this embodiment, the Step S200 includes the following steps. In Step S220, the panoramic image PI is unfolded from its center by the controller 120 to capture the unfolded panoramic image PI', and then the calibrated panoramic image CI'' is captured according to the unfolded panoramic image PI' and the trend line TL.

Figure 15:
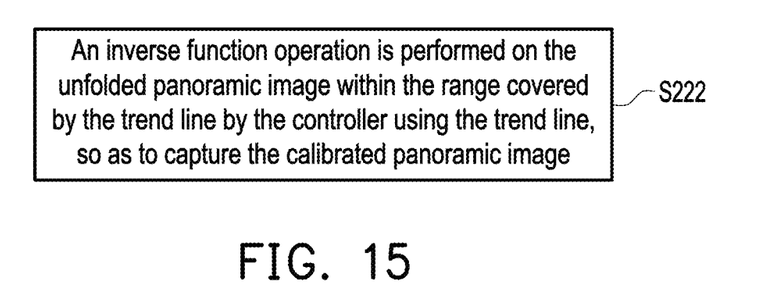
FIG. 15 is a flow chart of Step S220 in FIG. 14 in an embodiment.

FIG. 15 is a flow chart of Step S220 in FIG. 14 in an embodiment. Please refer to FIG. 15. In this embodiment, the above-mentioned Step S220 includes the following steps. In Step S222, the controller 120 uses the trend line TL to perform an inverse function operation on the unfolded panoramic image PI' within the range covered by the trend line TL, so as to capture the calibrated panoramic image CI''.

Figure 16:
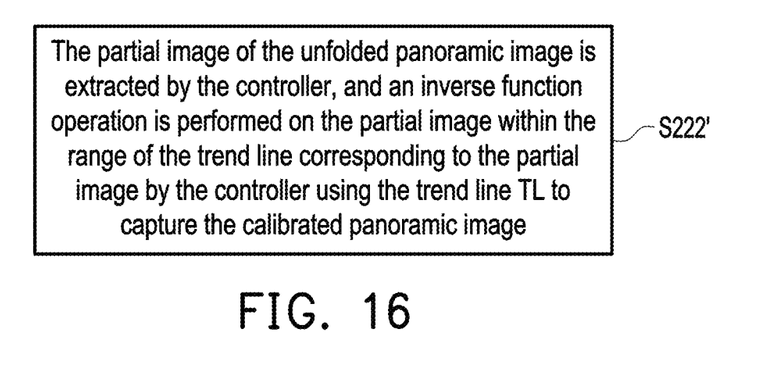
FIG. 16 is a flow chart of Step S220 in FIG. 14 in another embodiment.

FIG. 16 is a flow chart of Step S220 in FIG. 14 in another embodiment. Please refer to FIG. 16. In another embodiment, the above-mentioned Step S220 includes the following steps. In Step S222', the controller 120 extracts the partial image PIP' of the unfolded panoramic image PI' and uses the trend line TL to perform an inverse function operation on the partial image PIP' within the corresponding range of the trend line TL to capture the calibrated panoramic image CIP'''.

An embodiment of the present disclosure provides a computer-readable medium storing program code. The program code is configured to execute the method for calibrating a panoramic image PI as mentioned above. The computer-readable medium is, for example, a memory or a memory component, which may include random access memories, read-only memories, flash memories, disk drives, optical storage, tape storage, removable storage and other types of storage in any quantities. In an embodiment, the memory may be separate from the controller 120. In another embodiment, the memory may be integrated into the controller 120. In some embodiments, the memory may include software for performing one or more computational tasks, as well as, for example, a trained system such as a neural network or a deep neural network. Additionally, although aspects of the disclosed embodiments are described as being stored in memory, those of ordinary skill in the art will understand that such aspects may also be stored on other types of computer-readable media, such as secondary storage device, such as a hard drive or CD ROM, or other form of RAM or ROM, USB media, DVD, Blu-ray, or other optical drive media.

To sum up, according to an embodiment of the disclosure, in the panoramic image apparatus, the method for calibrating a panoramic image or the computer-readable medium, the panoramic image camera is utilized to capture toward the space including the calibration plate to capture the panoramic image including the calibration pattern image corresponding to the calibration pattern, and the controller is utilized to calibrate the panoramic image according to the calibration pattern and the variation of the calibration pattern image in the vertical direction at the edge of the image to provide the calibrated panoramic image. In this way, the imbalance of proportion between the center and the edge of the panoramic image may be easily calibrated.

What is claimed is:

1. A panoramic image apparatus comprising:
   a calibration plate having a calibration pattern and configured to be placed along a vertical direction;
   a panoramic camera adapted to capture toward a space comprising the calibration plate, and configured to capture in the vertical direction to capture a panoramic image comprising a calibration pattern image corresponding to the calibration pattern; and
   a controller electrically connected to the panoramic camera, wherein the controller is configured to calibrate the panoramic image according to the calibration pattern and a change of the calibration pattern image in the vertical direction at an edge of an image to provide a calibrated panoramic image;
   wherein the controller is configured to unfold a center of the panoramic image to capture an unfolded panoramic image, then capture the calibrated panoramic image according to the unfolded panoramic image and a trend line.

2. The panoramic image apparatus according to claim 1, wherein the calibration pattern is a checkerboard pattern staggered with different gray levels.

3. The panoramic image apparatus according claim 1, wherein the trend line is a trend curve formed according to a length spacing of a deformed image relative to a length spacing of an actual image,
   wherein the length spacing of the deformed image is a spacing between a plurality of positions with a value higher than a threshold after grayscaling an image in the unfolded panoramic image corresponding to the calibration pattern image along the vertical direction at the edge of the image, with a first-order differential and an absolute value thereof being taken, wherein the length spacing of the actual image is a spacing between a plurality of positions with a value higher than the threshold after grayscaling an image of the calibration pattern along the vertical direction at the edge of the image, with a first-order differential and an absolute value thereof being taken.

4. The panoramic image apparatus according to claim 3, wherein the controller is configured to utilize the trend line to perform an inverse function operation on the unfolded panoramic image within a range covered by the trend line, so as to capture the calibrated panoramic image.

5. The panoramic image apparatus according to claim 3, wherein the controller is configured to extract a partial image of the unfolded panoramic image, and perform an inverse function operation on the partial image within a range of the trend line corresponding to the partial image using the trend line to capture the calibrated panoramic image.

6. A method for calibrating a panoramic image comprising:

obtaining a trend curve between a length spacing of a deformed image and a length spacing of an actual image;

adjusting a change rate of a line segment within a preset range of the trend curve to a linear change rate to calibrate the panoramic image;

capturing a calibration pattern of a calibration plate by a panoramic camera to capture a panoramic image comprising a calibration pattern image corresponding to the calibration pattern, wherein the calibration pattern extends along a vertical direction; and calibrating the panoramic image by a controller according to the calibration pattern and a variation of the calibration pattern image along the vertical direction at an edge of in image to provide a calibrated panoramic image;

wherein the step of calibrating the panoramic image by the controller according to the calibration pattern and the variation of the calibration pattern image along the vertical direction at the edge of the image to provide the calibrated panoramic image comprises:

unfolding a center of the panoramic image by the controller to capture an unfolded panoramic image, and then capturing the calibrated panoramic image according to the unfolded panoramic image and a trend line.

7. The method according to claim 6, wherein the calibration pattern is a checkerboard pattern staggered with different gray levels.

8. The method according to claim 6, wherein the trend line is the trend curve formed according to the length spacing of the deformed image relative to the length spacing of the actual image, wherein the length spacing of the deformed image is a spacing between a plurality of positions with a value higher than a threshold after grayscaling an image in the unfolded panoramic image corresponding to the calibration pattern image along the vertical direction at the edge of the image, with a first-order differential and an absolute value thereof being taken, wherein the length spacing of the actual image is a spacing between a plurality of positions with a value higher than the threshold after grayscaling an image of the calibration pattern along the vertical direction at the edge of the image, with a first-order differential and an absolute value thereof being taken.

9. The method according to claim 6, wherein the step of unfolding the center of the panoramic image by the controller to capture the unfolded panoramic image, and then capturing the calibrated panoramic image according to the unfolded panoramic image and the trend line comprises:

performing an inverse function operation on the unfolded panoramic image within a range covered by the trend line by the controller using the trend line, so as to capture the calibrated panoramic image.

10. The method according to claim 6, wherein the step of unfolding the center of the panoramic image by the controller to capture the unfolded panoramic image, then capturing the calibrated panoramic image according to the unfolded panoramic image and the trend line comprises:

extracting a partial image of the unfolded panoramic image by the controller, and performing an inverse function operation on the partial image within a range of the trend line corresponding to the partial image using the trend line to capture the calibrated panoramic image.

11. A computer-readable medium storing a program code, wherein the program code is configured to execute the method for calibrating the panoramic image according to claim 6.

* * * * *